(12) United States Patent
Fraunhofer

(10) Patent No.: US 11,993,064 B2
(45) Date of Patent: May 28, 2024

(54) COVER STRUCTURE AND METHOD FOR PRODUCING A COVER STRUCTURE

(71) Applicant: Georg Fritzmeier GmbH & Co. KG, Aying (DE)

(72) Inventor: Stephan Fraunhofer, Aying (DE)

(73) Assignee: GEORG FRITZMEIER GMBH & CO. KG, Aying (DE)

(*) Notice: Subject to any disclaimer, the term of this patent is extended or adjusted under 35 U.S.C. 154(b) by 145 days.

(21) Appl. No.: 17/797,347

(22) PCT Filed: Jan. 26, 2021

(86) PCT No.: PCT/EP2021/051677
§ 371 (c)(1),
(2) Date: Aug. 3, 2022

(87) PCT Pub. No.: WO2021/156095
PCT Pub. Date: Aug. 12, 2021

(65) Prior Publication Data
US 2023/0057297 A1 Feb. 23, 2023

(30) Foreign Application Priority Data

Feb. 4, 2020 (DE) .......................... 102020102790.7
Mar. 19, 2020 (DE) .......................... 102020107676.2
(Continued)

(51) Int. Cl.
*B32B 37/10* (2006.01)
*B32B 7/12* (2006.01)
(Continued)

(52) U.S. Cl.
CPC ................ *B32B 37/10* (2013.01); *B32B 7/12* (2013.01); *H01M 50/164* (2021.01); *B32B 3/30* (2013.01);
(Continued)

(58) Field of Classification Search
CPC .. B32B 37/10; B32B 7/12; B32B 3/30; B32B 5/02; B32B 15/14; B32B 15/20;
(Continued)

(56) References Cited

U.S. PATENT DOCUMENTS 5,316,839 A 5/1994 Kato et al.
2011/0036654 A1 2/2011 Rinderlin et al.
(Continued)

FOREIGN PATENT DOCUMENTS

CN 106450083 2/2017
CN 106450083 A * 2/2017
(Continued)

OTHER PUBLICATIONS

English translation of Written Opinion dated May 17, 2021, from International Application No. PCT/EP2021/051677.
(Continued)

*Primary Examiner* — Vishal I Patel
(74) *Attorney, Agent, or Firm* — Beyer Law Group LLP

(57) ABSTRACT

The invention relates to a cover structure the SMC main body of which is simultaneously pressed and bonded with two additional layers in a bonding press.

7 Claims, 2 Drawing Sheets

(30) Foreign Application Priority Data

Apr. 2, 2020 (DE) .......................... 102020109259.8
Jun. 19, 2020 (DE) .......................... 102020116305.3

(51) Int. Cl.
*H01M 50/164* (2021.01)
*B32B 3/30* (2006.01)
*B32B 5/02* (2006.01)
*B32B 15/14* (2006.01)
*B32B 15/20* (2006.01)
*B32B 19/06* (2006.01)

(52) U.S. Cl.
CPC ................. *B32B 5/02* (2013.01); *B32B 15/14* (2013.01); *B32B 15/20* (2013.01); *B32B 19/06* (2013.01); *B32B 2260/021* (2013.01); *B32B 2260/046* (2013.01); *B32B 2307/3065* (2013.01); *B32B 2311/24* (2013.01); *B32B 2315/10* (2013.01); *B32B 2435/00* (2013.01); *H01M 2220/20* (2013.01)

(58) Field of Classification Search
CPC .............. B32B 19/06; B32B 2260/021; B32B 2260/046; B32B 2307/3065; B32B 2311/24; B32B 2315/10; B32B 2435/00; H01M 2220/20
See application file for complete search history.

(56) References Cited

U.S. PATENT DOCUMENTS

| | | |
|---|---|---|
| 2012/0103714 A1 | 5/2012 | Choi et al. |
| 2018/0230281 A1 | 8/2018 | Turanski et al. |
| 2021/0289675 A1 | 9/2021 | Schroiff et al. |

FOREIGN PATENT DOCUMENTS

| | | |
|---|---|---|
| DE | 102009050787 | 5/2011 |
| DE | 102010043899 | 5/2012 |
| DE | 102011005403 | 6/2012 |
| DE | 102013220778 | 4/2015 |
| DE | 102015101242 | 7/2016 |
| DE | 102018115503 | 1/2020 |
| DE | 102019118092 | 1/2021 |
| WO | 2018/149762 | 8/2018 |

OTHER PUBLICATIONS

International Search Report and Written Opinion from International Application No. PCT/EP2021/051677 dated May 17, 2021.
German Search Report from German Application No. 102020116305.3 dated Mar. 12, 2021.

* cited by examiner

COVER STRUCTURE AND METHOD FOR PRODUCING A COVER STRUCTURE

The invention relates to a cover structure, in particular for a battery, and to a method for producing a cover structure of this type.

For some years now, there has been a trend towards replacing internal combustion engines with electric motors. One problem here is the provision of sufficient battery capacity. In particular in the case of motor vehicles equipped with electric motors, batteries having a large capacity must be installed to ensure a satisfactory range. These batteries are often mounted on the underbody of the vehicle and must therefore be protected against external influences. Battery support structures of this type which are designed with an underride protection are disclosed in DE 10 2011 005 403 A1 and WO 2018/149762 A1, for example.

Here, the batteries are generally accommodated in a type of battery box, through which the actual battery is protected from the roadway by means of an underride guard. The part of the battery support structure facing the vehicle body/vehicle cabin is covered by a cover structure. This structure must be formed to withstand the heat generated by the battery for a certain time, e.g. five minutes, in the event of a fire, so that any spread to the vehicle cabin and other vehicle components is delayed.

A battery box of this type, also known as a battery housing, is described in printed publication DE 10 2010 043 899 A1. In this solution, a battery housing is formed with a housing cover which is formed in accordance with an outer contour of a battery cell, and a housing base which is attached to the hood-shaped housing cover. In the known solution, this battery housing is made of a plastic material that is difficult to ignite.

A solution of this type does not withstand a prolonged heat generation.

Document DE 10 2013 220 778 A1 also describes a battery housing made of a plastic material, which has the same disadvantages as the above mentioned battery housing structure.

Document DE 10 2009 050 787 A1, which is of a non-generic type, describes an aircraft component which consists of a plastic material and is provided with a mica-containing barrier layer to improve its fire behavior.

Solutions are known in which the cover structures that are used for example as battery box covers, are made as sheet-molded compound main bodies (SMC main bodies) and the required fire protection is then achieved by subsequently affixing a fire protection layer, for example of mica or micanite plates. It is also known to apply an electromagnetic compatibility layer (EMC layer) to the top side of the SMC main body.

This approach requires considerable manufacturing effort.

In contrast, the invention is related to a cover structure that meets, on the one hand, the fire protection requirements and, on the other hand, the EMC requirements and that can be manufactured with reduced effort. The object of the invention is to create a method for manufacturing a cover structure of this type.

This object is achieved by the combination of features of claim 1.

Advantageous further embodiments of the invention are the subject matter of the subclaims.

The cover structure is particularly designed for use as a battery box wall, preferably as a battery cover for an electric vehicle. This cover structure has a sheet-molded compound main body (SMC main body). At least one molded part and/or at least one flat plate is provided as a fire protection layer. The cover structure is designed with an electromagnetic compatibility layer (EMC layer) to improve its electromagnetic compatibility (EMC) and thus preferably to provide a shield with respect to other drive and open-loop/closed-loop control elements of the vehicle. The cover structure is particularly easy to manufacture because the fire protection layer and the EMC layer are bonded to the main body. Synergies can be exploited by uniformly bonding the three indicated components in a single operation in a bonding press.

The production of the cover structure is particularly simple if the at least one molded part of the fire protection layer and the EMC layer designed according to a geometry of the SMC main body are bonded to the main body.

It is particularly preferred for the SMC main body and the EMC layer and the fire protection coating to be bonded to one another by means of a reactive hot-melt adhesive system. Physically curing adhesives (thermoplastics) and chemically curing adhesives (thermosets) are possible here. This creates a particularly durable and resistant cover structure.

Of course, instead of such a hot-melt adhesive, another adhesive can also be used, for example a powder adhesive or other adhesives which are preferably applied in advance to the components or to at least one component of an adhesive pairing and are then activated by insertion into the bonding press to carry out the bonding. As explained, before insertion into the bonding press, the layer provided with the adhesive can be covered to prevent adhesion of contaminants or unintentional bonding.

In principle, however, it is also possible for the adhesive to be applied immediately before the components are inserted into the bonding press.

In automotive applications in particular, it is preferred for the EMC layer to be applied to the side of the SMC main body facing away from the fire protection coating. In particular, in the installation position of the cover structure in the vehicle, the fire protection coating is at the bottom and the EMC layer is at the top.

It is preferred for the fire protection coating to be substantially formed from at least one mica plate or micanite plate and/or from at least one mica molded part or micanite molded part. In this case, the fire protection coating is preferably composed of a plurality of such plates.

In a particularly simply structured exemplary embodiment, the EMC layer is designed as an aluminum foil or aluminum lamination which partially or largely or completely covers the SMC main body.

In order to facilitate the positioning of the EMC layer relative to the SMC main body, self-centering can be provided, which is formed by an indentation of the EMC layer and a matching bulge of the SMC main body.

The bonding press suitable for the production of a cover structure as described above has an upper die and a lower die the molding surfaces of which are adapted to the large surfaces of the cover structure to be bonded.

According to the method of the invention, the fire protection coating and the EMC layer are bonded together to the SCM main body in a single operation. This is done in a bonding press into which the SMC main body, the fire protection coating and the EMC layer (formed aluminum foil or lining) are inserted. Finally, by closing the mold halves (upper die/lower die), the SMC main body with the fire protection coating and with the EMC layer is pressed and bonded to form the cover structure.

In a further development of the method suitable for series production, the fire protection coating is first positioned and fixed on the lower die. After this insertion of the fire protection coating, the SMC main body is positioned in the bonding press. Then, the EMC coating is inserted.

If the fire protection coating has a molded part, the lower die has a corresponding molding surface.

In another further development of the method, the at least one molded part forming the fire protection coating is first pre-fixed to the underside of the SMC main body outside the bonding press. Then, the SMC main body together with the pre-fixed fire protection coating can be placed on the lower die of the bonding press, so that the two aforementioned steps of the method according to the invention take place simultaneously. Finally, the EMC coating is placed on the top side of the SMC main body.

In order to be able to apply the pre-fixation easily—e.g. in the form of adhesive strips—it is particularly preferred for the fire protection coating to be placed outside the bonding press on the SMC main body with its underside facing upwards where it is pre-fixed. The SMC main body with the pre-fixed fire protection coating can then be turned over before it is placed on the lower die of the bonding press.

Production time can be saved if pressing and bonding are performed promptly after the SMC main body has been demolded from an SMC press die, or promptly after the adhesive has been applied, or promptly after the fire protection coating has been pre-fixed.

Production time and load-bearing work can be saved if the pressing and bonding are carried out spatially close to or adjacent to the SMC pressing tool in which the SMC main body was formed. By way of example, the distance between the SMC pressing tool and the bonding press is a maximum of 10 meters, preferably a maximum of 5 meters.

Also with reference to the method according to the invention, the SMC main body, the EMC layer and the fire protection coating can be bonded one another by means of a reactive hot-melt adhesive system. Physically curing adhesives (thermoplastics) and chemically curing adhesives (thermosets) are possible here. This creates a particularly durable and resistant cover structure. As explained, other adhesives can be used as well.

A preferred exemplary embodiment of the invention is explained in more detail below with reference to schematic drawings. In the drawings.

Figure 1:
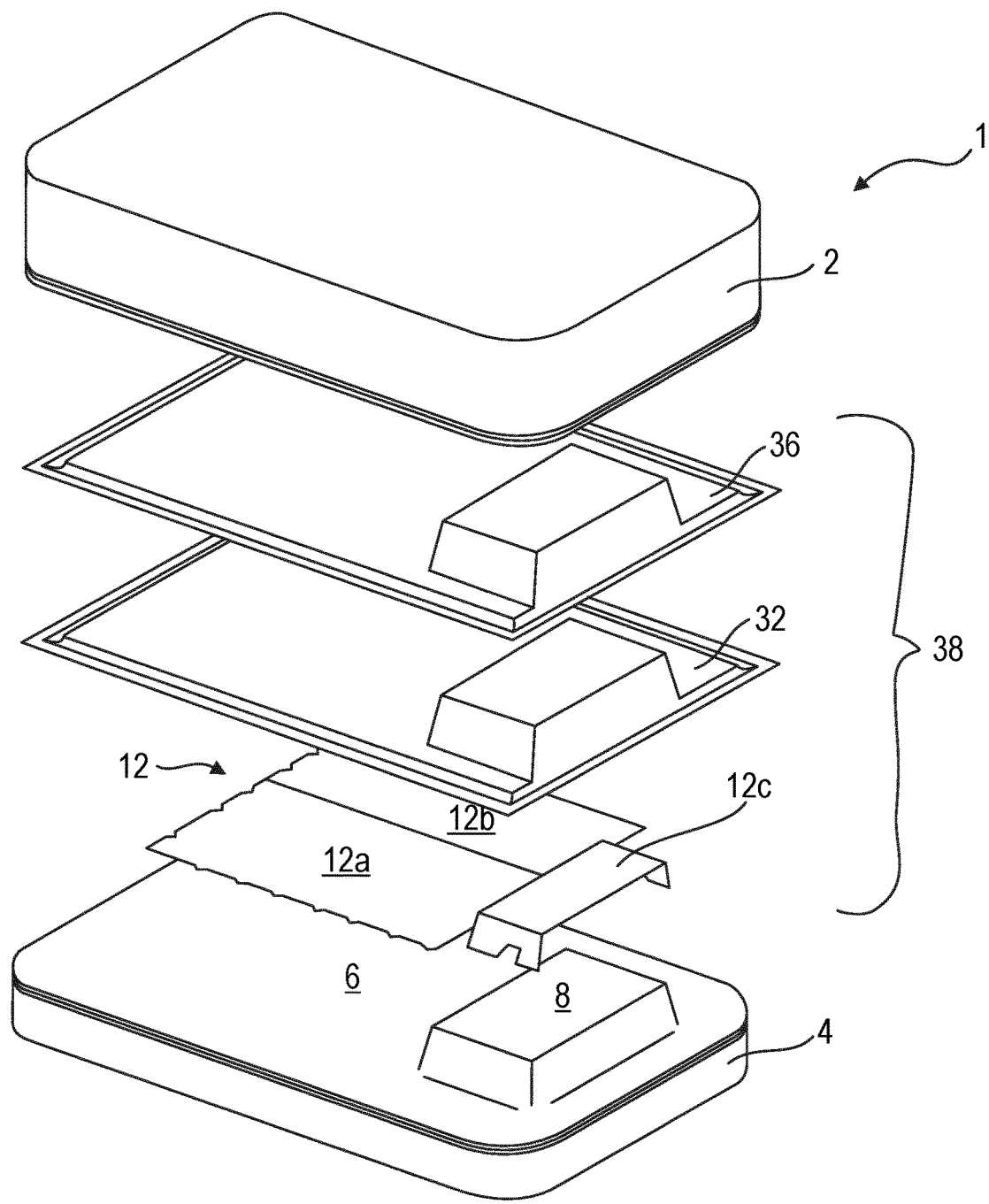
FIG. 1 shows an exploded view of the cover structure according to the invention before being pressed and bonded in a bonding press.

FIG. 1 shows the fundamental structure of a bonding press 1 having an upper die 2 and a lower die 4, which are moved apart in the representation according to FIG. 1. Mold surfaces 6 are formed on the lower die 4 (and accordingly also in the upper die 2) which, in the closed state, press and bond three components 32, 12, 36 of a cover structure 38. In the illustrated exemplary embodiment, the cover structure 38 is used as the battery cover of an electric vehicle.

The mold surfaces 6 are formed as 3D surfaces in accordance with the geometry of this cover structure 38. In the illustrated exemplary embodiment, the mold surface 6 of the lower die 4 bulges upward in the region on the right in FIG. 1, toward the upper die 2, so that a bulge 8 is formed. A corresponding indentation (not shown) is provided in the upper die 2, so that when the bonding press 1 is closed, a cowl is bonded which, in the mounted state, covers a component of the electric vehicle, for example a tank or the like.

An SMC main body 32 as well as a fire protection coating 12 and an EMC layer 36 are inserted into the opened bonding press 1. In the illustrated exemplary embodiment, the fire protection coating 12 is formed in several parts from mica plates 12a, 12b, 12c, which are first placed on the mold surface 6. The mica plate 12c here covers the bulge 8 forming the cowl. The mica plates 12a, 12b, 12c are formed according to the contour of the molding surfaces 6 or the cover structure 38 to be formed. The two mica plates 12a, 12b, are spaced apart from the mica plate 12c. In the installed state of the cover structure 38, the mica plates 12a, 12b, 12c cover the areas of the cover structure 38 that are at risk in the event of heat development and the overlying components of the electric vehicle.

First, the adhesive is applied to the mica plates 12a, 12b, 12c and to the EMC layer 36 by means of a spray gun.

In a series production, the adhesive is preferably applied by means of a robot in a spinning spray application.

After the mica plates 12a, 12b, 12c have been inserted, the SMC main body 32 is inserted into the bonding press 1, which consists, for example, of a fiber mat, a fiber fleece or the like, which is surrounded by a plastics matrix, for example a polyester or vinyl ester resin. The SMC blank formed in this manner was melted in an SMC pressing tool heated to a forming/melting temperature prior to application of the method according to the invention, so that the SMC blank could be formed into the predetermined geometry of the SMC main body 32 and retained this 3D geometry after curing/demolding.

Alternatively, the mica plates 12a, 12b, 12c are first pre-fixed to the underside of the SMC main body 32 outside the bonding press by means of adhesive strips. In order to be able to attach them easily, the mica plates 12a, 12b, 12c are placed outside the bonding press 1 on the SMC main body 32 with its (in the installed position) underside facing upwards. Then, the SMC main body 32 with the pre-fixed mica plates 12a, 12b, 12c is turned over and placed on the lower die 4 of the bonding press 1.

In series production, the coated mica plates 12a, 12b, 12c are positioned on the lower die 4 where they are fixed.

To improve electromagnetic compatibility (EMC), the EMC layer 36 is bonded to the SMC main body 32 on the large surface (at the top in FIG. 1) facing away from the fire protection coating 12. In the illustrated exemplary embodiment, this EMC layer 36 is formed from an aluminum foil/lining that was formed in a forming tool according to the 3D geometry of the SMC main body 32 prior to the application of the method according to the invention.

To facilitate the positioning of the EMC layer 36 relative to the SMC main body 32, self-centering is provided which, in the illustrated exemplary embodiment, is formed by an indentation of the EMC layer 36 and a matching bulge of the SMC main body 32. When the EMC layer 36 is lowered onto the SMC main body 32, the bulge moves into the indentation in a form-fitting manner, resulting in a (pre)positioning of the two parts relative to each other.

Figure 2:
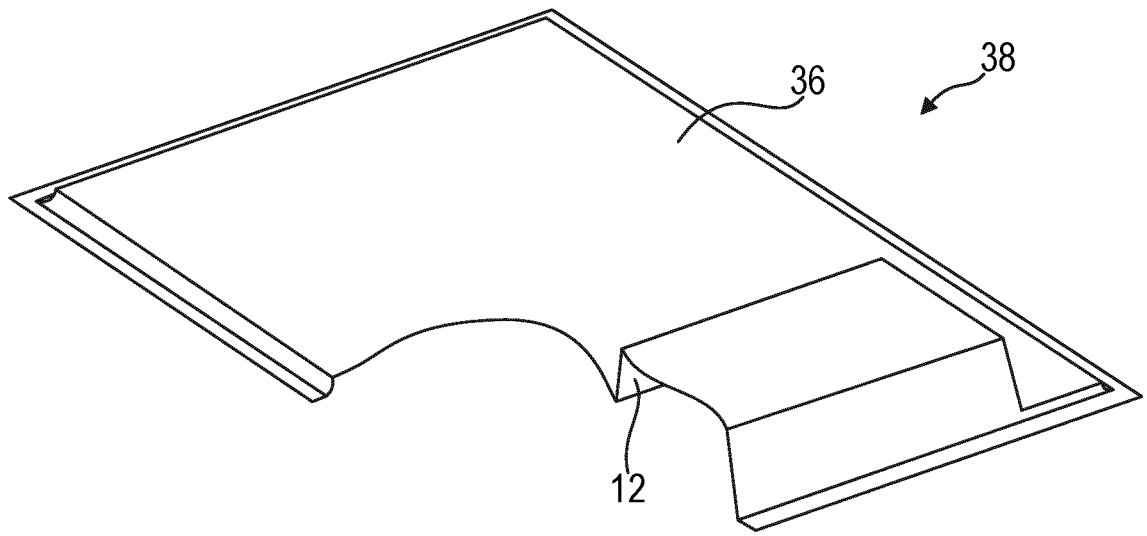
FIG. 2 shows a perspective view of a large part of the cover structure from FIG. 1 bonded and pressed according to the invention.

Finally, in a single operation, the SMC main body 32 is pressed and bonded, on the one hand, to the fire protection coating 12 and, on the other hand, to the EMC layer 36 by means of a reactive hot-melt adhesive system and the bonding press 1, so that after this operation the cover structure 38 is formed as shown in FIG. 2, which is provided with the EMC layer 36 towards the vehicle cabin of the electric vehicle and with the fire protection coating 12 towards the battery.

Figure 3:
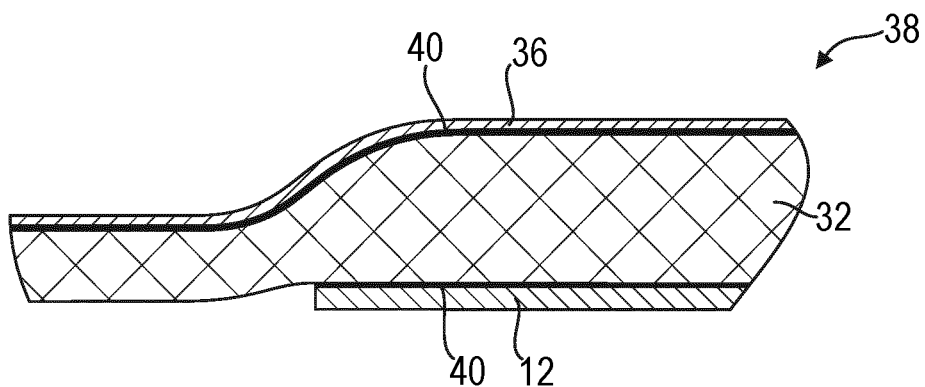
FIG. 3 shows a detail of a cross-section through a cover structure from FIG. 2.

FIG. 3 shows the layered structure of the fully bonded cover structure 38 with the EMC layer 36 at the top (view according to FIG. 3), which is bonded to the surface of the SMC main body 32 via the adhesive of an adhesive joint 40. This body is bonded to the mica plates 12a, 12b, 12c via adhesive of a further adhesive joint 40. Physically curing adhesives (thermoplastics) and chemically curing adhesives (thermosets) can here be used. This ensures a homogeneous layered structure of the cover structure 38, which is optimized with regard to EMC problems, fire protection resistance and mechanical strength.

In this way, dimensionally stable cover structures 38 can be produced that comply with fire protection regulations, are suitable even for large battery capacities and can have an area of significantly more than 1 m².

Disclosed is a cover structure 38, the SMC main body 32 of which is pressed and bonded simultaneously with two further layers 12, 36 in a bonding press 1.

LIST OF REFERENCE SIGNS 1 bonding press
2 upper die
4 lower die
6 mold surface
8 bulge
12 fire protection coating
12a mica plate
12b mica plate
12c mica plate
32 SMC main body
36 EMC layer
38 cover structure
40 adhesive joint

The invention claimed is:

1. A method for manufacturing a cover structure, in particular for a battery of an electric vehicle, comprising the steps of:
    inserting a fire protection coating into a bonding press,
    inserting an SMC main body into the bonding press,
    inserting an EMC layer into the bonding press, and
    bonding the SMC main body to the fire protection coating and the EMC layer by means of the bonding press.

2. The method according to claim 1, wherein said steps are carried out in said order.

3. The method according to claim 1, wherein the fire protection coating is initially pre-fixed to the SMC main body.

4. The method according to any one of claim 1, wherein the SMC main body and the EMC layer and the fire protection coating are bonded to one another by means of an adhesive applied to at least one component of an adhesive pairing, such as a powder adhesive or by means of a reactive hot-melt adhesive system.

5. The method according to claim 4, wherein the adhesive is applied at the bonding press or at a time interval prior to bonding in the bonding press.

6. The method according to any one of claim 1, wherein the pressing is carried out promptly after the SMC main body has been demolded from an SMC pressing tool or promptly after the adhesive has been applied or promptly after the fire protection coating has been pre-fixed.

7. The method according to any one of claim 1, wherein the pressing takes place spatially close to or adjacent to an SMC pressing tool in which the SMC main body has been formed.

* * * * *